(12) United States Patent
Ekberg et al.

(10) Patent No.: US 8,190,636 B2
(45) Date of Patent: May 29, 2012

(54) METHOD, APPARATUS AND COMPUTER PROGRAM PRODUCT FOR PROVIDING OBJECT PRIVILEGE MODIFICATION

(75) Inventors: Jan-Erik Ekberg, Vantaa (FI); Elena Reshetova, Helsinki (FI)

(73) Assignee: Nokia Corporation, Espoo (FI)

( * ) Notice: Subject to any disclaimer, the term of this patent is extended or adjusted under 35 U.S.C. 154(b) by 689 days.

(21) Appl. No.: 12/242,281

(22) Filed: Sep. 30, 2008

(65) Prior Publication Data

US 2010/0082679 A1  Apr. 1, 2010

(51) Int. Cl.
*G06F 17/00* (2006.01)
(52) U.S. Cl. ........ 707/783; 707/955; 707/960; 707/825; 707/810; 707/793
(58) Field of Classification Search .......... 707/791, 707/793, 810, 825, 783, 955, 960
See application file for complete search history.

(56) References Cited

U.S. PATENT DOCUMENTS

| | | |
|---|---|---|
| 6,199,181 B1 | 3/2001 | Rechef et al. |
| 7,630,986 B1 * | 12/2009 | Herz et al. ............ 1/1 |
| 2004/0133794 A1 * | 7/2004 | Kocher et al. ............ 713/193 |
| 2005/0165783 A1 | 7/2005 | Hyser |
| 2006/0053285 A1 * | 3/2006 | Kimmel et al. ............ 713/166 |
| 2006/0090192 A1 | 4/2006 | Corby et al. |
| 2008/0126740 A1 | 5/2008 | Wrighton et al. |
| 2009/0286512 A1 * | 11/2009 | Huber et al. ............ 455/411 |

OTHER PUBLICATIONS

International Search Report for PCT/FI2009/050748 mailed Dec. 4, 2009.

* cited by examiner

*Primary Examiner* — Sana Al Hashemi
(74) *Attorney, Agent, or Firm* — Alston & Bird LLP

(57) ABSTRACT

An apparatus for providing object privilege modification may include a processor. The processor may be configured to receive an indication to modify at least one privilege associated with an object. The processor may be further configured to modify the at least one privilege associated with the object based at least in part on the indication and update a policy file based at least in part on the modified privilege associated with the object. The processor may be additionally configured to provide for an output of the object based at least in part on the modified privilege associated with the object. Associated methods and computer program products may also be provided.

28 Claims, 6 Drawing Sheets

```
Module "Example policy" Mode "r+"

EVENTS

OPEN_R

9999 RuleForCagedProcesses      ALLOW "/dev/stdin"
                                ALLOW "/dev/stdout"
                                ALLOW "/lib"
                                ALLOW "/usr/share"

1001 43735e700f6b2304f88c1e7dc1e3a137eae35b3d    INHERIT RuleForCagedProcesses
                                                 ALLOW "/usr/NewGame"

OPEN_W

9999 RuleForCagedProcesses      ALLOW "/dev/stdin"
                                ALLOW "/dev/stdout"

1001 43735e700f6b2304f88c1e7dc1e3a137eae35b3d    INHERIT RuleForCagedProcesses
                                                 ALLOW "/usr/NewGame"
                                                 DENY  "/usr/NewGame/SpecificInfo"

BIND 1001 43735e700f6b2304f88c1e7dc1e3a137eae35b3d    AF_UNIX   ALLOW      "/usr/NewGame"
                                                 AF_INET   CT_LOCAL   9999
```

FIG. 2

```
Module "Example policy" Mode "r+"

PUBLIC_PLACE

FILESYSTEM      "/home/user/PublicData"
FILESYSTEM      "/tmp"
CONNECTIVITY    AF_INET CT_NON_LOCAL 80

EVENTS

OPEN_R

9999 RuleForCagedProcesses     ALLOW "/dev/stdin"
                               ALLOW "/dev/stdout"
                               ALLOW "/lib"
                               ALLOW "/usr/share"

1001 43735e700f6b2304f88c1e7dc1e3a137eae35b3d   INHERIT RuleForCagedProcesses
                                                ALLOW "/usr/NewGame"

OPEN_W

9999 RuleForCagedProcesses     ALLOW "/dev/stdin"
                               ALLOW "/dev/stdout"

1001 43735e700f6b2304f88c1e7dc1e3a137eae35b3d   INHERIT RuleForCagedProcesses
                                                ALLOW "/usr/NewGame"
                                                DENY  "/usr/NewGame/SpecificInfo"

BIND 1001 43735e700f6b2304f88c1e7dc1e3a137eae35b3d   AF_UNIX    ALLOW      "/usr/NewGame"
                                                AF_INET    CT_LOCAL   9999
```

FIG. 3

METHOD, APPARATUS AND COMPUTER PROGRAM PRODUCT FOR PROVIDING OBJECT PRIVILEGE MODIFICATION

TECHNOLOGICAL FIELD

Embodiments of the present invention relate generally to communications technology and, more particularly, relate to apparatuses, methods and computer program products for enabling object privilege modification.

BACKGROUND

The modem communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to and between users and other entities. With the aid of wireless and mobile networking technologies the availability of wireless communications devices has increased, due in part to reductions in cost of devices and the construction of infrastructures able to support these devices. Since consumers can more readily own and/or utilize a wireless communications device, the demands for dynamic functionality of these devices has increased. The marketplace has responded to these demands by providing increased functionality to the devices. For example, conventional communication devices can store various information and, as such, access control mechanisms can be provided to regulate access to the information for various purposes (e.g., read, write, execute, etc.). In this regard, each information can be provided with a privilege level which can dictate its accessibility, for example, to various applications. As such, a third party software (e.g., open source software) may be considered an non-trusted source (from the device's perspective). Therefore, the software can be isolated from other software and, restricted from accessing information and in its operation on the device.

However, these access control mechanisms are often complex and hence, difficult to understand and be configured by an ordinary user. Additionally, access control systems on the devices are often static. Moreover, the configuration of the access control mechanisms are based on the perspective of the device, instead of the user, and as such, access to information can be granted to the applications preferred by the device, while a third party software, preferred by the user for access to a desired information, may remain isolated and restricted from accessing to that information, since the integrity of that application cannot be ascertained by the device. One solution to this problem would be to grant all software (preferred and non-trusted) access to all information on the device. However, this solution would pose a serious security and privacy risk. Another solution would be to raise the access level of the third party software or otherwise decrease its access restriction. However, this solution would also pose a serious security risk (e.g., access to information that should be restricted to the software).

Accordingly, it may desirable to modify the privilege level of a system object, based at least in part on a user preference, while preserving the security architecture of the device.

BRIEF SUMMARY

A method, apparatus and computer program product are therefore provided that may enable the provision of object privilege modification. Thus, for example, a user may modify the privilege level associated with an object (e.g., a file or a system resource) and as such, a third party application (e.g., from an non-trusted source) may access the object. In this regard, a caged application (e.g., an application that is isolated from accessing system data or resources) may gain access to data that would have been otherwise restricted to the application.

In one example embodiment, a method of providing object privilege modification is provided. The method may include receiving an indication to modify at least one privilege associated with an object. The method may also include modifying the at least one privilege associated with the object based at least in part on the indication. The method may further include updating a policy file based at least in part on the modified privilege associated with the object. Additionally, the method may include providing for an output of the object based at least in part on the modified privilege associated with the object.

In another example embodiment, a computer program product for providing object privilege modification is provided. The computer program product may include at least one computer-readable storage medium having computer-executable program code portions stored therein. The computer-executable program code portions may include a first program code instructions, second program code instructions, third program code instructions, and fourth program code instructions. The first program code instructions may be for receiving an indication to modify at least one privilege associated with an object. The second program code instructions may be for modifying the at least one privilege associated with the object based at least in part on the indication. The third program code instructions may be for updating a policy file based at least in part on the modified privilege associated with the object. The fourth program code instructions may be for providing for an output of the object based at least in part on the modified privilege associated with the object.

In another example embodiment, an apparatus for providing object privilege modification is provided. The apparatus may include a processor that may be configured to receive an indication to modify at least one privilege associated with an object. The processor may be configured to modify the at least one privilege associated with the object based at least in part on the indication and update a policy file based at least in part on the modified privilege associated with the object. The processor may also be configured to provide for an output of the object based at least in part on the modified privilege associated with the object.

In yet another example embodiment, an apparatus for providing object privilege modification. The apparatus may include means for receiving an indication to modify at least one privilege associated with an object. The apparatus may further include means for modifying the at least one privilege associated with the object based at least in part on the indication and updating a policy file based at least in part on the modified privilege associated with the object. The apparatus may further include means for providing for an output of the object based at least in part on the modified privilege associated with the object.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2 illustrates an example graphical representation of a policy file according to an embodiment of the present invention;

FIG. 3 illustrates another example graphical representation of a policy file according to an example embodiment of the present invention;

DETAILED DESCRIPTION

Figure 1:
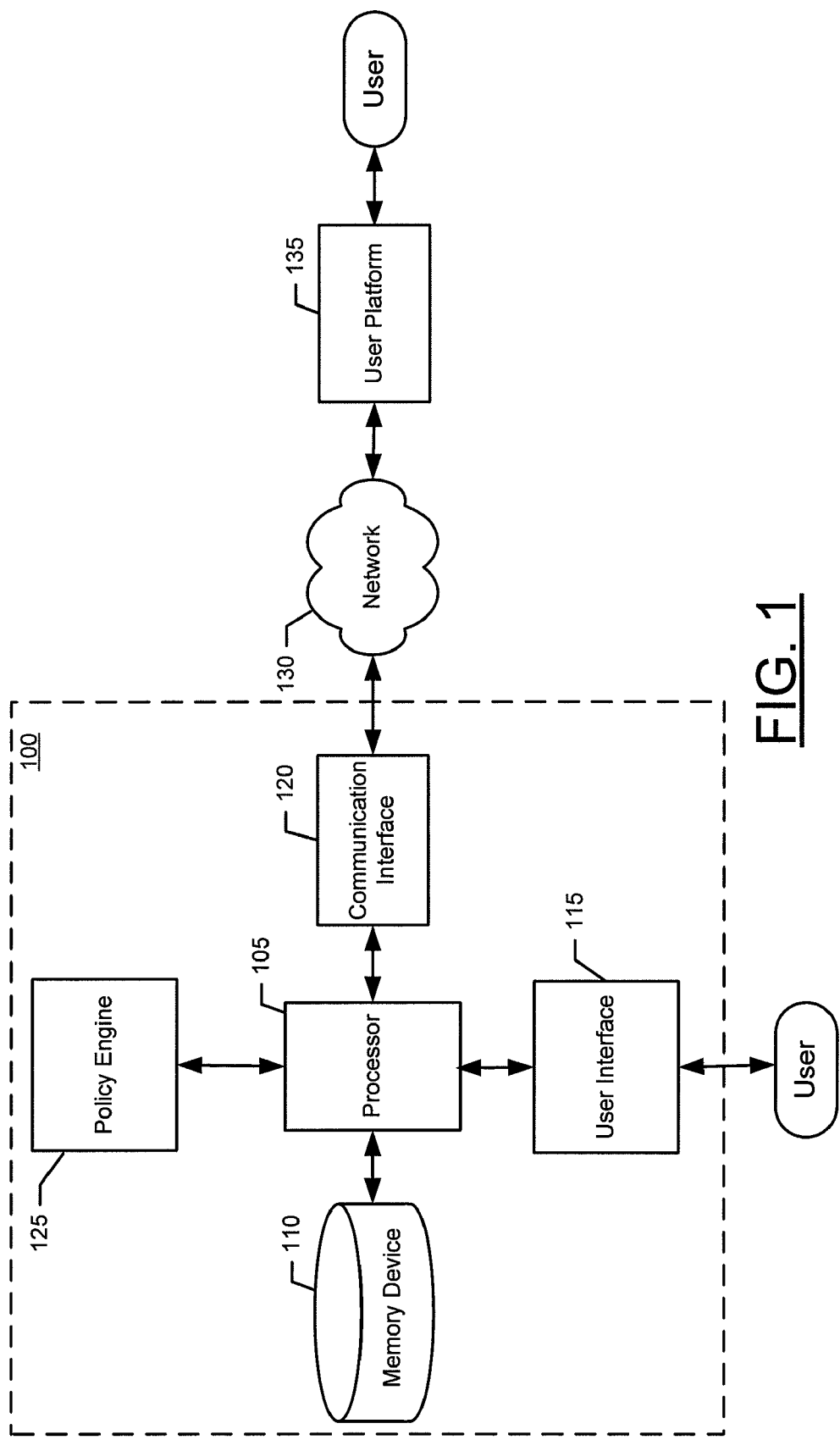
FIG. 1 is a schematic block diagram of an apparatus for providing object privilege modification according to an example embodiment of the present invention.

Embodiments of the present invention now will be described more fully hereinafter with reference to the accompanying drawings, in which some, but not all embodiments of the inventions are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being transmitted, received and/or stored in accordance with embodiments of the present invention, such as, for example, media files (e.g., image file(s), music file(s), video file(s), text documents, configuration files, communication logs (e.g., phone call log, short message service (SMS) message log, multimedia messaging service (MMS) message log, e-mail log, instant messaging log, other messaging protocol log, and/or the like), etc.), application files, and/or the like. Moreover, the term "exemplary", as used herein, is not provided to convey any qualitative assessment, but instead merely to convey an illustration of an example. Further, the terms "resource" or "system resource" may be used interchangeably to refer to application libraries such as (e.g. phonebook/address book, network interface, hardware devices (e.g., camera, microphone, GPS, Bluetooth, other sensory devices, etc), and/or the like. Additionally, the terms "cage" or "jail" may be used interchangeably to refer to a virtual entity which may restrict access of an application such as, for example, a non-trusted application, to data, resource, and/or network, or in other words, isolate the application from accessing system data or resources. The term "subject" or "system subject" may be used interchangeably to refer to an active entity, which may represent a user or system process such as, for example, an application. The terms "object" or "system object" may be used interchangeably to refer to a passive entity, which may represent data, a system resource, or even a subject. The term "privilege level" may refer to permissions or capabilities associated with an access control system that provides or otherwise regulates access of one or more subjects to one or more objects.

Thus, use of any such terms should not be taken to limit the spirit and scope of embodiments of the present invention. Moreover, although exemplary embodiments of the present invention may be described with respect to a public place, other embodiments of the present invention may be equally applicable to various types of other locations based at least in part on the modification to the privilege associated with the object. Additionally, although exemplary embodiments of the present invention may be described with respect to enabling caged applications to access information that would otherwise be restricted, other embodiments of the present invention may be equally applicable to enabling other types of applications to access information that would otherwise be restricted. Further, although exemplary embodiments of the present invention may be described with respect to receiving user inputs, other embodiments of the present invention may be equally applicable to automated process or in other words minimal to no user input.

According to an exemplary embodiment, the privilege level associated with a system object (e.g., a file or a resource) may be modified. In some embodiments, the privilege level of the object may be modified to adapt or correspond to the access level of a caged application and as such, the caged application may have access to an object that may otherwise have been restricted to the application. For example, the privilege level associated with the object may be brought to a level similar to the access level of a caged or non-trusted application. Thus, the object may be placed in a virtual community location wherein access to the object may be unrestricted to some degree, based at least in part on the privilege level. In this regard and in some embodiments, the privilege level may be completely removed or otherwise disassociated with the object. In other words, in some embodiments, the privilege level may be lowered to a degree wherein all system subjects may access the object. As such, the object may be associated with a "public place", one type of virtual community location, wherein access to the object associated with the public place may be unrestricted for all system subjects (e.g., applications (trusted and non-trusted) resident on or otherwise associated with the device). The modification to the privilege level may be temporary or permanent. In this regard, the user may revert to the previous privilege level, for example, after a predetermined period of time, or keep the modification indefinitely.

For example, a user may desire to view an image file generated by a trusted resource (e.g., camera associated with the device) using a caged image viewer. In this regard, the user may select the image file, select the properties of the file, and associate the file to a public place. As such, the privilege level associated with the object may be completely removed and the policy file may be updated to reflect the reduced privilege level or removal thereof. Accordingly, the caged image viewer, and all other applications (trusted and/or non-trusted) may gain access to the image file. In some embodiments, an application, configured to provide a selection of trusted applications that may access the file (e.g., "Open with" application), may be configured to include in the selection one or more non-trusted or caged applications that may have registered with or otherwise indicated to the device the ability to process objects of a type similar to the desired file. In this regard and referring to the example above, the caged image viewer may also be listed in the selection provided by the "Open with" application.

In other embodiments, the privilege level associated with the object may be reduced or partially removed, temporarily or permanently, and as such, the object may be associated with a different virtual community location wherein access to the object may be unrestricted for some system subjects (e.g., some trusted and/or non-trusted applications resident on or otherwise associated with the device). As such, exemplary embodiments may include various types of privilege levels, and thus virtual community locations, based at least in part on various criteria such as, for example, the type of one or a group of objects (e.g., media files versus application files, text, etc.), the format of one or more objects, the frequency of usage of one or more subjects or objects, the storage period of one or more subjects (e.g., a third party or non-trusted application may have been used for a year without, for example, any involuntary side-effects), the rating of a security risk assigned to one or more objects (e.g., high risk, medium, low), and/or the like.

An example embodiment of the invention will now be described with reference to FIG. 1, in which certain elements of an apparatus 100 for providing object privilege modification are displayed. The apparatus 100 of FIG. 1 may be employed, for example, on a user device, e.g., a mobile terminal, and/or a server platform. Furthermore, it should be noted that the apparatus 100 of FIG. 1, may also be employed on a variety of other devices, both mobile and fixed, and therefore, embodiments of the present invention should not be limited to application on devices such as those listed above. Alternatively, embodiments may be employed on a combination of devices including, for example, those listed above. Moreover, embodiments of the present invention may be embodied wholly at a single device or by a combination of devices such as when devices are in a client/server relationship. Furthermore, it should be noted that the devices or elements described below may not be mandatory and thus some may be omitted in certain embodiments.

Referring now to FIG. 1, an apparatus 100 for providing object privilege modification is provided. The apparatus 100 may include or otherwise be in communication with a processor 105, a user interface 115, a communication interface 120 and a memory device 110. The memory device 110 may include, for example, volatile and/or non-volatile memory. The memory device 110 may be configured to store information, data, applications, instructions and/or the like for enabling the apparatus to carry out various functions in accordance with example embodiments of the present invention. For example, the memory device 110 could be configured to buffer input data for processing by the processor 105. Additionally or alternatively, the memory device 110 could be configured to store instructions for execution by the processor 105. As yet another alternative, the memory device 110 may be one of a plurality of databases that store information and/or media content.

In some embodiments, one or more applications may be transferred to and/or installed on the apparatus 100 and stored, for example, on the memory device 110. In exemplary embodiments, non-trusted applications may be caged by default, for example, to prevent harm to the apparatus 100, the processor 105, the user interface 115, the communication interface 120, and the memory device 110, applications resident or otherwise associated with the apparatus 100, and/or the like. In this regard, "non-trusted application" may refer to an application transferred from an unverified source or unauthorized entity, from the perspective of the apparatus 100, which may be provide a risk to the apparatus 100, one or more data and/or applications resident or otherwise associated with the apparatus 100, and/or the like. In this regard, the processor 205 may be configured to define one or more types of cages, by defining caging policies, such as, for example, cages with networking, cages with camera access, cages with personal information (e.g., address/phone book, etc.), cages with microphone access, and/or the like. In some embodiments, the choice of cage type whereto an non-trusted application may be associated may be determined by a user.

In exemplary embodiments, a policy file may be stored in a storage device, having memory, which may be locally or remotely associated with the apparatus 100, such as, for example, the memory device 110. In some embodiments, the policy file may describe the policies regulating the various types of actions or operations occurring on the device, such as, for example, the rules managing access of one or more subjects to one or more objects stored on or otherwise associated with the apparatus 100. As such, the policy file may be configured to identify one or more data or resources whose privilege levels have been modified, for example, by including an entry relating to the modification of the data or resource. Exemplary embodiments of a policy file may be described in further details below with respect to FIGS. 2 and 3.

The processor 105 may be embodied in a number of different ways. For example, the processor 105 may be embodied as various processing means such as one or more of a processing element, a coprocessor, a controller or various other processing devices including integrated circuits such as, for example, an ASIC (application specific integrated circuit), an FPGA (field programmable gate array), a hardware accelerator, and/or the like. In an example embodiment, the processor 105 may be configured to execute instructions stored in the memory device 110 or otherwise accessible to the processor 105.

Meanwhile, the communication interface 120 may be embodied as any device or means embodied in either hardware, software, or a combination of hardware and software that is configured to receive and/or transmit data from/to a network and/or any other device or module in communication with the apparatus 100. In this regard, the communication interface 120 may include, for example, an antenna and supporting hardware and/or software for enabling communications with a wireless communication network. In fixed environments, the communication interface 120 may alternatively or also support wired communication. As such, the communication interface 120 may include a communication modem and/or other hardware/software for supporting communication via cable, DSL, universal serial bus (USB) or other mechanisms.

The user interface 115 may be in communication with the processor 105 to receive an indication of a user input at the user interface 115 and/or to provide an audible, visual, mechanical or other output to the user. As such, the user interface 115 may include, for example, a keyboard, a mouse, a joystick, a touch screen, a display, a microphone, or other input/output mechanisms. In an example embodiment in which the apparatus 100 is embodied as a server or some other network devices, the user interface 115 may be limited, or eliminated.

In an example embodiment, the processor 105 may be in communication with or be embodied as, include or otherwise control a policy engine 125. The policy engine 225 may be any means such as a device or circuitry embodied in hardware, software or a combination of hardware and software, such as the processor operating under software control, that is configured to perform the corresponding functions of the policy engine 125 as further described below. The means of the policy engine 125 may include, for example, means for receiving an indication to modify at least one privilege associated with an object, means for modifying the at least one privilege associated with the object based at least in part on the indication, means for updating a policy file based at least in part on the modified privilege associated with the object, and means for providing for an output of the object based at least in part on the modified privilege associated with the object, embodied as, for example, hardware elements (e.g., a suitably programmed processor, combinational logic circuit, and/or the like), computer code (e.g., software or firmware)

embodied on a computer-readable medium (e.g. memory device 110) that is executable by a suitably configured processing device (e.g., the processor 105), or some combination thereof. In some embodiments, the policy engine 125 may perform various functions including, but not limited to, modifying the privilege level of at least one object, reading and/or modifying a policy file, making access control decisions relating to one or more objects based at least in part on the policy file, and/or the like.

In some embodiments, the policy engine 125 may be configured to modify the privilege level of at least one object. In exemplary embodiments, the policy engine 125 may be associated with a privilege modifier (not shown) which may be configured to modify the privilege levels of objects. In this regard, the policy engine 125 may receive an indication to modify the privilege level of an object based at least in part on a user input. For example, a user may desire to make an image file accessible to a preferred image viewer application, which application may be non-trusted, and as such, move the image file to a virtual community location (e.g., public place). Accordingly, the policy engine 125 may be configured to modify the privilege level of the object based at least in part on the user input. As a further example, a user may desire to make a microphone device associated with the apparatus 100 accessible to a preferred audio processing application, which application may be non-trusted, and as such, move the microphone to a virtual community location (e.g., public place). In exemplary embodiments, the policy engine 125 may be configured to completely or partially remove the privilege level associated with the object, based at least in part on the virtual community location. In the above example, the policy engine 125 may completely remove the privilege level based at least in part on the user's request to move the data into a virtual community location. In some embodiments, the policy engine 125 may be configured to automatically modify the privilege level of an object based at least in part on user preference, information associated with other objects with similar criteria (e.g., compare file extensions, content, period of inactivity or frequency of use, length of storage, etc.), and/or the like. The user preference and/or objects criteria may be stored on a storage device including memory, remotely or locally associated with the apparatus 100, such as, for example, the storage device 210.

In some embodiments, the policy engine 125 may be configured to associate one or more objects to a virtual community location. In this regard, the policy engine 125 may access and modify the policy file to reflect the association. In exemplary embodiments, the policy engine 125 may add a new entry to the policy file or modify or otherwise update an existing entry in the policy file relating to one or more objects to reflect the association of one or more objects to a virtual community location. A "virtual community location" may refer to a virtual location wherein privilege levels associated with an object are partially or completely removed. For example, a "public place" may refer to a virtual community location wherein privilege levels are completely removed from objects and as such, access to one or more objects is unrestricted for all applications resident or otherwise associated with the apparatus 100, including non-trusted applications. Once the object has been associated to a virtual community location, one or more applications (trusted and/or non-trusted) may access the actual data or resource to perform various functions on the actual data and/or resource, such as, for example, reading, writing, executing, and/or the like, based at least in part on the privilege level associated with the object.

As such, with respect to the previous example above relating to the image file, the image file may be associated to a public place wherein the non-trusted image viewer application may access the image file to perform the functions discussed above (e.g., read, write, execute, etc.). Similarly, with respect to the previous example above relating to the microphone, the microphone may be associated with a public place wherein the non-trusted audio processing application may access the microphone to perform the functions discussed. In one or more of these situations, the policy engine 125 may be configured to modify the policy file to reflect the association. In this regard, and referring to FIG. 4, a graphical representation of an exemplary user interface according to an example embodiment of the present invention is illustrated. In some embodiments, the user interface may be configured to modify the privilege level of one or more objects. As such, the user interface may be configured to move or otherwise associate one or more objects to a virtual community location and the one or more objects may be accessed by one or more applications (trusted or non-trusted) based at least in part on the privilege level associated with the one or more objects. In this regard, a "move to public" functionality 410 may be provided that may move one or more objects to a public place (e.g., a type of virtual community location), wherein access to one or more objects is unrestricted for all applications resident or otherwise associated with the apparatus 100, as mentioned above.

The user interface may also include other functionalities to move one or more specific types of object to one or more virtual community locations based at least in part on various criteria such as, for example, a type of the object (e.g., media files, text files, application files), the format of the object (Joint Photographic Experts Group (JPEG), Moving Pictures Experts Group (MPEG), MPEG-1 Audio Layer 3 (MP3), etc.), the time period of storage, and/or the like. For example, the user interface may provide a "move all *.mp3 to public" functionality 420 which may move all objects in a MP3 format to the public place. In some embodiments, the user interface may include functionalities to move one or more objects to various other types of virtual communication locations based at least in part on the privilege level of the objects. In some embodiments, the association may be permanent, and remain valid until revoked based at least on a user input, a predetermined criteria (e.g., time period), and/or the like. The user interface may provide a selection of one or more objects to select for privilege level modification. In exemplary embodiments, the user interface may only provide, or otherwise make visible to the user, one or more objects (e.g., files, system resources, etc.), for example, in a file manager application, that are not critical to the security or integrity of the device (e.g., configuration files). As such, the modification of a privilege may be provided by a data-related plug-in mechanism provided by, for example, a computer operating system or file manager wherein user activation of the visualization or other representation of the object may initialize an interface in which the user may cause the modification of at least one privilege associated with an object.

Referring back to FIG. 1, in exemplary embodiments, an application configured to provide a selection of trusted applications that may access an object (e.g., "Open with" application), may be configured to include in the selection one or more non-trusted applications that may have registered with or otherwise indicated to the apparatus the ability to process objects of a type similar to the desired file. In this regard, if a non-trusted application is selected, the user may be prompted to confirm the selection of the non-trusted application to access the desired object. In some embodiments, the user may be presented with a dialog box instructing the user with the potential security risk associated with the non-trusted application accessing the object.

Upon receiving a confirmation to use the non-trusted application, the non-trusted application may be launched, and the policy engine 125 may modify the privilege level associated with the object (e.g., adding a new entry to the policy file or modifying or otherwise updating an existing entry in the policy file relating to the object and/or the application) and temporarily allowing the object to be accessed by the selected non-trusted application. In some embodiments, the non-trusted application may be allowed to perform one or more operations on the object such as, for example, read, write, execute, and/or the like. In other embodiments, a copy of the object may be created and the actions may be performed thereon. In exemplary embodiments, the non-trusted application may only access the object for a single instance (e.g., the duration of the single instance of the application). For example, after the non-trusted application has terminated access to the object, each and any subsequent access to the same object and/or one or more other objects may require confirmation from the user in a manner similar to the one described above. In other exemplary embodiments, the non-trusted application may access the same object and/or one or more similar objects, such as, for example, the same type (e.g., media files, text files, application files, etc.) for a predetermined amount of instances based least in part on a determination of the user. For example, the user may allow the application to access the same object five times without requiring any intervention from the user.

In other embodiments, if one or more non-trusted applications preferred by the user for accessing the object are not represented in the selection, a dialog box may be presented to the user wherein the user may be prompted to associate the object to a virtual community location. As such, the non-trusted applications may be allowed to access the object and be represented in the selection. In some embodiments, a copy of the data or resource may be generated and one or more applications may perform various functions, as described above, on the copy of data and/or resource. In other embodiments, the policy engine 125 may be configured to add a new entry to the policy file or modify or otherwise update an existing entry in the policy file relating to one or more subjects. Accordingly, the user activities regarding the representation of the object may trigger a user query related to the modification of object privileges, the result of which may be used to cause the modification of at least one privilege associated with an object.

Figure 4:
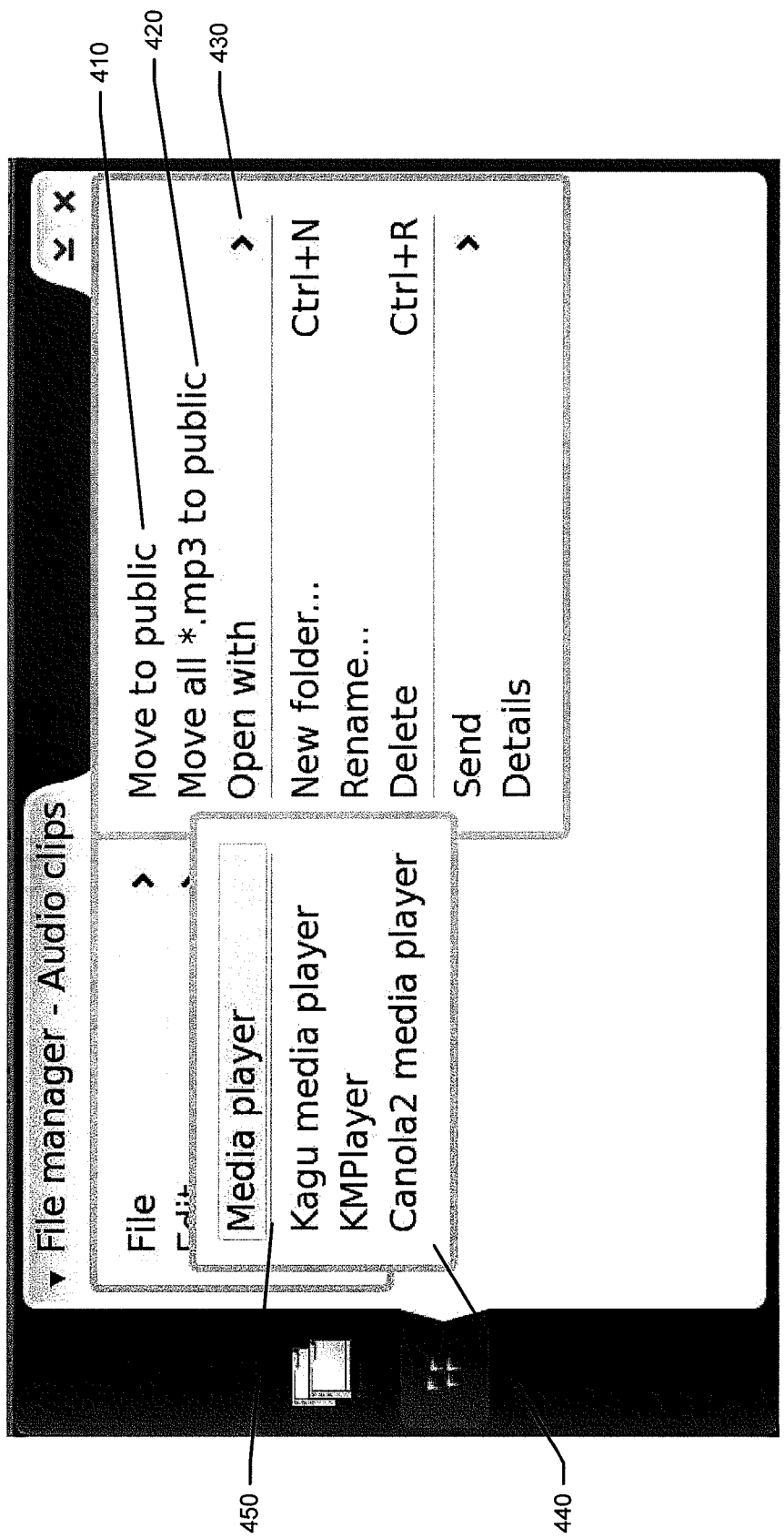
FIG. 4 illustrates a graphical representation of an exemplary user interface according to an example embodiment of the present invention.

In this regard and referring to FIG. 4, a graphical representation of an exemplary user interface providing the "Open with" functionality according to an example embodiment of the present invention is illustrated. As can be seen in FIG. 4, an "Open with" application 430 may be selected to open a desired application and a selection of applications (trusted and non-trusted) may be provided in an area 440. In some embodiments, the trusted applications may be separated from the non-trusted applications, for example, by a line 450 or a gap.

Referring back to FIG. 1, in exemplary embodiments, the apparatus 100 may include one or more types of virtual community locations and/or the policy engine 125 may be configured to define one or more virtual community locations. In some embodiments, the virtual community locations may be based at least in part on the privilege level of an object, on extension format of the file, the period of time stored on a memory device associated with the apparatus 100, the frequency of usage by the apparatus 100, and/or the like. In other embodiments, a type of virtual community location may be configured to grant each request for access to objects associated with the virtual community location based at least in part on user input. For example, each access to one or more objects may only be granted by the user through an acceptance of each access request from one or more subjects. In some embodiments, the user may provide an acceptance (and/or denial) of an access request via input from a dialog box.

In some embodiments, the policy engine 125 may also be configured may associate one or more objects, initially associated with a first caged application, with a second caged application. In this regard, the policy engine 125 may modify the privilege level of one or more objects associated with a first caged application to be adapted to the access level of another cage or the privilege level of data associated with a second caged application. In this regard and in some embodiments, the data and/or resource may be accessible by the first and second caged applications. For example, the privilege level of an object associated with a first caged application may be lowered to the privilege level of one or more objects associated with a second caged application. In other embodiments, the data and/or resource may no longer be accessible by the first application but may only be accessible to the second application. As previously mentioned, the modification to the privilege level may be temporary or permanent.

In this regard, and referring now to FIG. 2, an example graphical representation of a portion of a policy file according to an embodiment of the present invention is illustrated. A portion of the policy file illustrates an EVENTS section which may describe access control rules for each controlled event in the system. Although there may only be three events illustrated in FIG. 2, namely OPEN_R (open a file for reading), OPEN_W (open a file for writing) and BIND (binding a socket), additional events may be included in the policy such as, for example, close (CLOSE), close modified (CLOSE MODIFIED), execute (EXEC), remove directory (RMDIR), unlink (UNLINK), connect (CONNECT) and/or the like. Each event description may include one or more caging rules and the caging rules may apply to caged applications. In some embodiments, the policy engine 125 may be configured to define one or more caging rules (and non-caging rules) for one or more applications. In this regard, NewGame may be a non-trusted application and as such put into a cage based at least in part on the rules specified in the policy file. In some embodiments, the policy engine 125 may be configured to search one or more entries associated with the caged application in the events section for each application (trusted or non-trusted). The search may be based at least in part on a user identifier (UID) and a hash value of the application. If the UID and the hash value are found, the policy engine 125 may search for one or more rules associated with the non-trusted application and process access control for the application based at least in part the rules. However, if no rules are found for one or more non-trusted application, access may be always denied for the one or more non-trusted applications.

For example, the NewGame application may have a UID of 1001 and a hash value 43735e700f08c1e7dc1e3a137eae35b3d. The policy engine 125 may be configured to read the rules provided for each application and process the access controls for each application based at least in part on the for rules. For example and in this regard, based at least on the rules associated with the NewGame application, the NewGame application may attempt to open for reading a file from the "/user/NewGame" directory. Under the reading event (e.g., OPEN_R), the policy engine 125 may be configured to read the one or more entries or rules associated with NewGame application and determine that the action may be allowed (e.g., the entry in the policy file providing "ALLOW '/user/NewGame/'" under the reading event (OPEN_R)), however, the policy engine 125 may also determine that the same action may be restricted for the objects (e.g., file) in "/user" directory, because the rule with ALLOW qualifier may not be found. However, the rule for each directory may also include a DENY qualifier, which may indicate that a file or a directory may be denied access thereto for action on the object and/or resource associated with the object. For example, there may be two rules "ALLOW 'user/NewGame'" and "DENY 'user/NewGame/SpecificInfo'". In this regard, the entire directory for the NewGame application (e.g., "/user/NewGame") may be accessible for writing with the exception of the "SpecificInfo" subdirectory.

In some embodiments, in order to reduce the size of policy file, the policy engine 125 may be configured to define one or more rules of inheritance. As such, the non-trusted application may inherit sets of rules from any other application defined earlier in the event. Each application may inherit at least one set of rules. Inheritance may reduce the size of the policy file significantly because the basic rules for one or more caged applications may be the same. For example and as illustrated in FIG. 2, each caged applications may inherit RuleForCagedProcesses and be able to read standard devices "/dev/stdin" and "/dev/stdout", read shared information "/usr/share" and etc. In some embodiments, by using inheritance, the policy engine 125 may specify these rules only once and each application may inherit them. As illustrated in FIG. 2 for example, the NewGame application may inherit RuleForCagedProcesses set of rules and be allowed to open, for example, the "/lib" directory for reading. Therefore, according to the policy file in FIG. 2, the NewGame application may be allowed to read and write its own information ("/user/NewGame" directory), reading system libraries and non-critical directories, and binding either Unix sockets to its home directory or network sockets on local address 127.0.0.1 and port 9999

Referring to FIG. 3, another example graphical representation of a portion of a policy file according to an embodiment of the present invention is illustrated. Please refer to the comments above regarding the events section of this portion of the policy file with respect to FIG. 2. Referring to FIG. 3, a portion of a policy file may include a public_place section. As mentioned above, the policy engine 125 may associate one or more objects to a virtual community location and modify the policy file (e.g., adding new rules or modifying existing ones) to reflect such association. The rules associated with a virtual community location may be directed to one or more objects and other aspects, including, but not limited to, file system, network connectivity, and/or the like. In this regard, the PUBLIC_PLACE section may include three objects that have been associated with a public place (e.g., virtual community location) by the policy engine 125. In FIG. 3 for example, the first two rules may be directed to file system resources. These rules may indicate that every subject can access any files under "/home/user/PublicData" and "/tmp" directories. Accordingly, the NewGame application, and other non-trusted applications, may now be able to access these files which have otherwise been restricted to the NewGame and other non-trusted applications, despite the lack of a direct rule associated with the cage of the NewGame application. The last rule may relate to a connectivity rule. In this regard, one or more or all subjects may bind and connect to the Internet socket on external addresses and on port 80. As such, the NewGame application may be able to access not only local address 127.0.0.1 and port 9999, but also make the connections specified above. As mentioned above, in exemplary embodiments, the PUBLIC_PLACE section may include various types of objects such as, for example, data (e.g., media files, application files, communication logs, etc.), resources (e.g., applications, devices, etc.), and/or the like. Moreover, the policy file may include other sections for various other types of virtual community locations.

Figure 5:
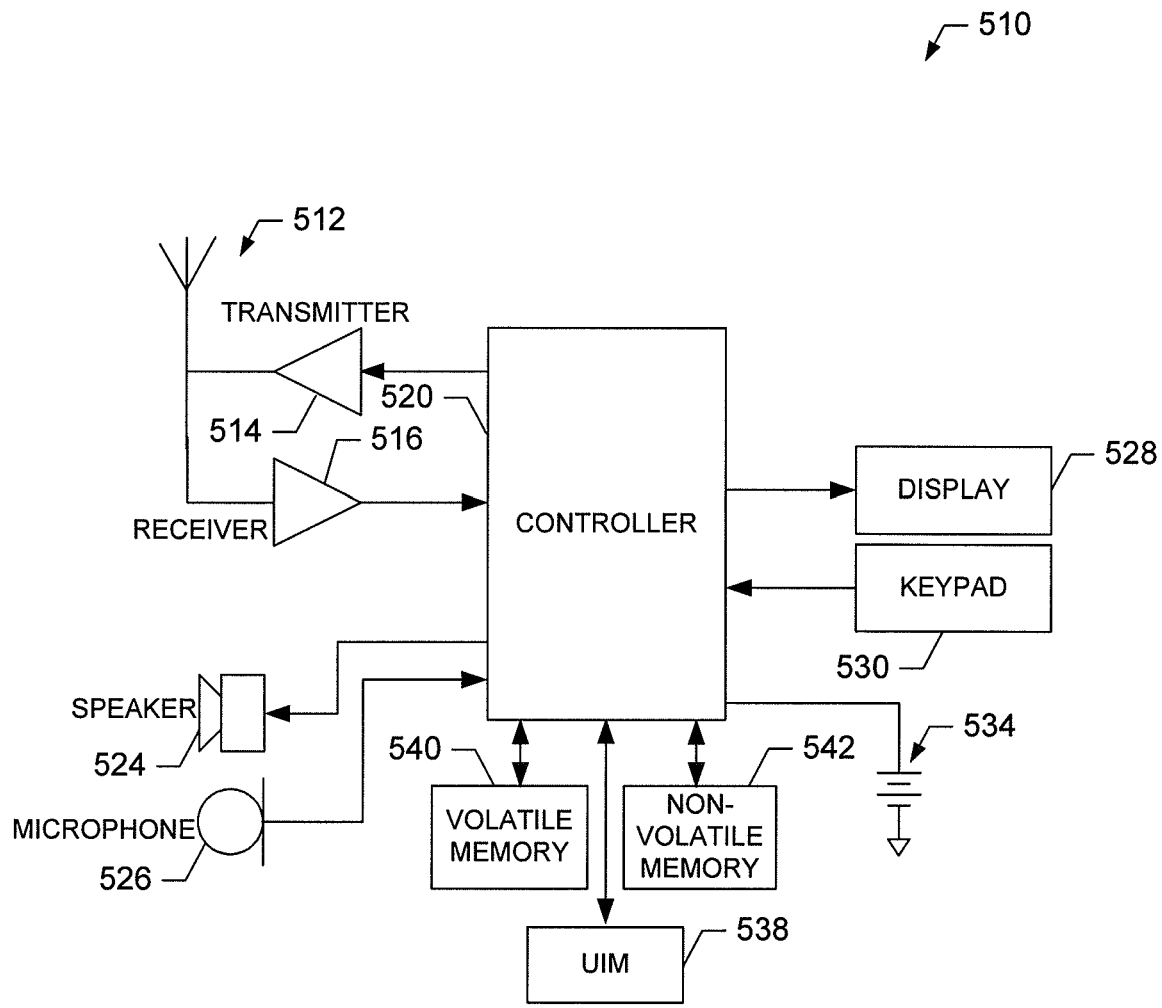
FIG. 5 is a schematic block diagram of a mobile terminal according to an example embodiment of the present invention.

FIG. 5 illustrates a block diagram of a mobile terminal 510 that may benefit from example embodiments of the present invention. It should be understood, however, that a mobile terminal as illustrated and hereinafter described is merely illustrative of one type of mobile terminal that may benefit from some embodiments of the present invention and, therefore, should not be taken to limit the scope of embodiments of the present invention. Several types of mobile terminals, such as mobile phones, mobile communication devices, portable digital assistants (PDAs), pagers, mobile televisions, gaming devices, all types of computers (e.g., laptops or mobile computers), cameras, camcorders, audio/video players, radio, global positioning system (GPS) devices, or any combination of the aforementioned, and other types of communications systems, can readily employ embodiments of the present invention. The mobile terminal 510 may be an example of the apparatus 100 of FIG. 1.

The mobile terminal 510 may include an antenna 512 (or multiple antennas) in operable communication with a transmitter 514 and a receiver 516. The mobile terminal 510 may further include an apparatus, such as a controller 520 or other processing element that provide signals to and receives signals from the transmitter 514 and receiver 516, respectively. The signals may include signaling information in accordance with any of numerous wireless communication standards. In this regard, the mobile terminal 510 may be capable of operating with one or more air interface standards, communication protocols, modulation types, and access types.

It is understood that the apparatus, such as the controller 520, may include circuitry for implementing, among others, audio/video and logic functions of the mobile terminal 510. For example, the controller 520 may comprise a digital signal processor device, a microprocessor device, and various analog to digital converters, digital to analog converters, and/or other support circuits. Control and signal processing functions of the mobile terminal 510 may be allocated between these devices according to their respective capabilities. The controller 520 thus may also include the functionality to encode and interleave message and data prior to modulation and transmission. The controller 520 may additionally include an internal voice coder, and may include an internal data modem. Further, the controller 520 may include functionality to operate one or more software programs, which may be stored in memory. For example, the controller 520 may be capable of operating a connectivity program, such as a conventional web browser. The connectivity program may then allow the mobile terminal 510 to transmit and receive web content, such as location-based content and/or other web page content, according to a Wireless Application Protocol (WAP), Hypertext Transfer Protocol (HTTP) and/or the like, for example.

The mobile terminal 510 may also comprise a user interface including an output device such as an earphone or speaker 524, a microphone 526, a display 528, and a user input interface, which may be operationally coupled to the controller 520. As mentioned above, the microphone may record audio data such as, for example, audio data related to a travel method. The user input interface, which allows the mobile terminal 510 to receive data, may include any of a number of devices allowing the mobile terminal 510 to receive data, such as a keypad 530, a touch display (not shown) or other input device. In embodiments including the keypad 530, the keypad 530 may include numeric (0-9) and related keys (#, *), and other hard and soft keys used for operating the mobile terminal 510. Alternatively, the keypad 530 may include a QWERTY keypad arrangement. The keypad 530 may also include various soft keys with associated functions. In addition, or alternatively, the mobile terminal 510 may include an interface device such as a joystick or other user input interface. The mobile terminal 510 further includes a battery 534, such as a vibrating battery pack, for powering various circuits that are used to operate the mobile terminal 510, as well as optionally providing mechanical vibration as a detectable output.

The mobile terminal 510 may further include a user identity module (UIM) 538. The UIM 538 is typically a memory device having a processor built in. The UIM 538 may include, for example, a subscriber identity module (SIM), a universal integrated circuit card (UICC), a universal subscriber identity module (USIM), a removable user identity module (R-UIM), etc. The UIM 538 typically stores information elements related to a mobile subscriber. In addition to the UIM 538, the mobile terminal 510 may be equipped with memory. The mobile terminal 510 may include volatile memory 540 and/or non-volatile memory 542. For example, volatile memory 540 may include Random Access Memory (RAM) including dynamic and/or static RAM, on-chip or off-chip cache memory, and/or the like. Non-volatile memory 542, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 540 non-volatile memory 542 may include a cache area for temporary storage of data. The memories can store any of a number of pieces of information, and data, used by the mobile terminal 510 to implement the functions of the mobile terminal 510.

Moreover, although not shown in FIG. 4, the mobile terminal 510 may communicate in accordance with, for example, radio frequency (RF), Bluetooth (BT), Infrared (IR) or any of a number of different wireline or wireless communication techniques, including LAN, WLAN, Worldwide Interoperability for Microwave Access (WiMAX), WiFi, ultra-wide band (UWB) techniques and/or the like. Additionally, the mobile terminal 510 may include a GPS.

Figure 6:
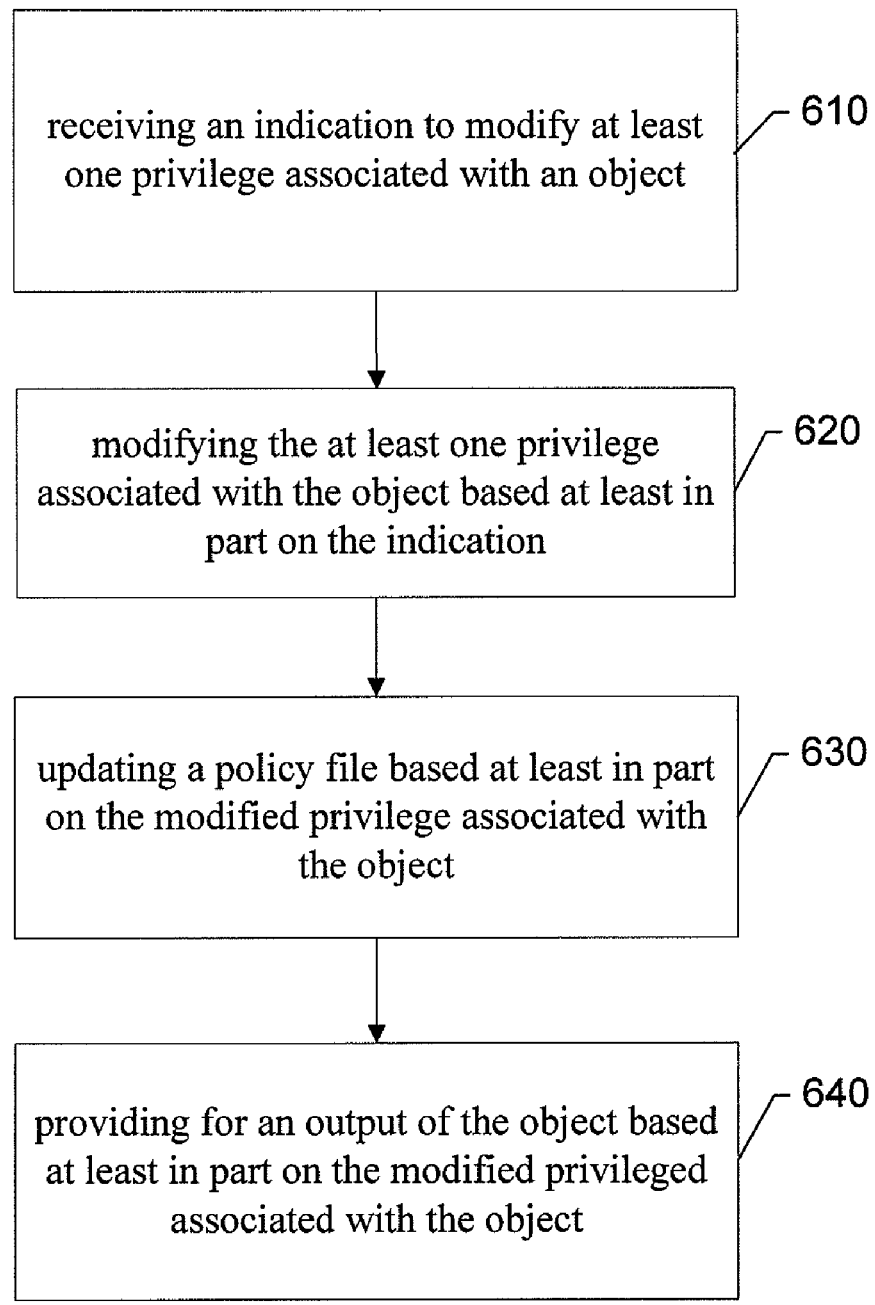
FIG. 6 is a flowchart according to an example method of providing object privilege modification according to an embodiment of the present invention.

FIG. 6 is a flowchart of a system, method and program product according to example embodiments of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device and executed by a processor (e.g., the processor 105). As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). Further, the functions specified in the flowchart block(s) or step (s) may be executed in any order. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block (s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowcharts, can be implemented by special purpose hardware-based computer systems which perform the specified functions or steps, or combinations of special purpose hardware and computer instructions.

In this regard, one embodiment of a method for providing as provided in FIG. 6 may include receiving an indication to modify at least one privilege associated with an object at operation 610. The method may further include modifying the at least one privilege associated with the object based at least in part on the indication at 620. At operation 630, the method may further include updating a policy file based at least in part on the modified privilege associated with the object. Further, at operation 640, the method may include providing for an output of the object based at least in part on the modified privilege associated with the object. In some embodiments, providing for an output may comprise providing for the accessibility or usage of the object based at least in part of the modified privilege associated with the object. In other embodiments, providing for an output may also comprise providing for access to or use of the object (e.g., to perform read, write, execute operations, and/or the like). In yet other embodiments, providing for an output may also comprise providing at least one subject at least one of access to or use of the object. In yet other embodiments, providing for an output may also comprise providing for any storage or transmission of the object regardless of whether the output is user perceptible or not.

In an example embodiment, receiving an indication to modify at least one privilege associated with an object may comprise receiving an indication to modify at least one privilege associated with a data file (e.g., media files, applications file, etc.). In an example embodiment, receiving an indication to modify at least one privilege associated with an object may comprise receiving an indication to modify at least one privilege associated with a system resources (e.g., camera, microphone, Bluetooth, etc).

In some embodiments, modifying the at least one privilege associated with the object based at least in part on the indication may comprise reducing or completely removing a privilege associated with the object. In other embodiments, updating a policy file based at least in part on the modified privilege associated with the object may comprise at least one of adding, deleting, or modifying an entry provided in the policy file.

In some embodiments, receiving an indication to modify at least one privilege associated with an object may comprise associating the object to a virtual community location. In exemplary embodiments, associating the object to a virtual community location may comprise associating the object to a virtual community location based at least on at least one of a plurality of criteria (e.g., type of one or a group of objects (e.g., media files versus application files, text, etc.), the format of one or more objects, the frequency of usage of one or more subjects or objects, the storage period of one or more subjects, and/or the like).

In an example embodiment, an apparatus for performing the method above may include a processor (e.g., the processor 105) configured to perform each of the operations (610-640) described above. The processor may, for example, be configured to perform the operations by executing stored instructions or an algorithm for performing each of the operations. Alternatively, the apparatus may include means for performing each of the operations described above. In this regard, according to an example embodiment, examples of means for performing operations 610 to 640 may include, for example, a processor (e.g., the processor 105), the policy engine 125, any other device or circuitry embodied in hardware, software or a combination of hardware and software, and/or the like.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
    enabling a caged application to access an object by:
        receiving an indication to modify at least one privilege associated with the object;
        modifying the at least one privilege associated with the object, based at least in part on the indication and by associating the object with a virtual community location;
        updating a policy file based at least in part on the modified privilege associated with the object; and
        providing for an output of the object based at least in part on the modified privileged associated with the object.

2. The method of claim 1, wherein providing for an output of the object based at least in part on the modified privileged associated with the object comprises providing for at least one of access to or use of the object based at least in part on the modified privileged associated with the object.

3. The method of claim 2, wherein providing for at least one of access to or use of the object based at least in part on the modified privileged associated with the object comprises providing at least one subject at least one of access to or use of the object.

4. The method of claim 1, wherein receiving an indication to modify at least one privilege associated with an object comprises receiving an indication to modify at least one privilege associated with a data file.

5. The method of claim 1, wherein receiving an indication to modify at least one privilege associated with an object comprises receiving an indication to modify at least one privilege associated with a system resource.

6. The method of claim 1, wherein modifying the at least one privilege associated with the object based at least in part on the indication comprises reducing a privilege associated with the object.

7. The method of claim 1, wherein updating a policy file based at least in part on the modified privilege associated with the object comprises at least one of adding, deleting, or modifying an entry provided in the policy file.

8. The method of claim 1, wherein in an instance in which the object is associated with the virtual community location, one or more caged applications may access the object.

9. The method of claim 8, wherein associating the object to a virtual community location comprises associating the object to a virtual community location based at least on at least one of a plurality of criteria.

10. A computer program product comprising:
    at least one computer-readable non-transitory storage medium having program code portions stored therein, the program code which when executed by an apparatus cause the apparatus at least to:
    enable a caged application to access an object by:
        receiving an indication to modify at least one privilege associated with the object;
        modifying the at least one privilege associated with the object, based at least in part on the indication and by associating the object with a virtual community location;
        updating a policy file based at least in part on the modified privilege associated with the object; and
        providing for an output of the object based at least in part on the modified privileged associated with the object.

11. The computer program product of claim 10, wherein providing for an output of the object based at least in part on the modified privileged associated with the object comprises instructions for providing for at least one of access to or use of the object based at least in part on the modified privileged associated with the object.

12. The computer program product 11, wherein the instructions for providing for at least one of access to or use of the object based at least in part on the modified privileged associated with the object comprises instructions for providing at least one subject at least one of access to or use of the object.

13. The computer program product of claim 10, wherein the receiving an indication to modify at least one privilege associated with an object comprises instructions for receiving an indication to modify at least one privilege associated with a data file.

14. The computer program product of claim 10, wherein receiving an indication to modify at least one privilege associated with an object comprises instructions for receiving an indication to modify at least one privilege associated with a system resource.

15. The computer program product of claim 10, wherein modifying the at least one privilege associated with the object based at least in part on the indication comprises instructions for reducing a privilege associated with the object.

16. The computer program product of claim 10, wherein updating a policy file based at least in part on the modified privilege associated with the object comprises instructions for at least one of adding, deleting, or modifying an entry provided in the policy file.

17. The computer program product of claim 10, wherein in an instance in which the object is associated with the virtual community location, one or more caged applications may access the object.

18. The computer program product of claim 17, wherein the instructions for associating the object to a virtual community location comprises instructions for associating the object to a virtual community location based at least in part at least one of a plurality of criteria.

19. An apparatus comprising:
    a processor configured; and a memory including computer program code, the memory and the computer program code configured to, with the processor, cause the apparatus to at least:

receive an indication to modify at least one privilege associated with the object;

modify the at least one privilege associated with the object, based at least in part on the indication and by associating the object with a virtual community location;

update a policy file based at least in part on the modified privilege associated with the object; and provide for an output of the object based at least in part on the modified privilege associated with the object.

20. The apparatus of claim 19, wherein the memory including the computer program code is further configured to, with the processor, cause the apparatus to provide for an output of the object based at least in part on the modified privileged associated with the object comprises the processor configured to provide for at least one of access to or use of the object based at least in part on the modified privileged associated with the object.

21. The apparatus of claim 20, wherein the memory including the computer program code is further configured to, with the processor, cause the apparatus to provide for at least one of access to or use of the object based at least in part on the modified privileged associated with the object comprises the processor configured to provide at least one subject at least one of access to or use of the object.

22. The apparatus of claim 19, wherein the memory including the computer program code is further configured to, with the processor, cause the apparatus to modify at least one privilege associated with an object comprises the processor configured to receive an indication to modify at least one privilege associated with a data file.

23. The apparatus of claim 19, wherein the memory including the computer program code is further configured to, with the processor, cause the apparatus to modify at least one privilege associated with an object comprises the processor configured to receive an indication to modify at least one privilege associated with a system resource.

24. The apparatus of claim 19, wherein the memory including the computer program code is further configured to, with the processor, cause the apparatus to modify the at least one privilege associated with the object based at least in part on the indication comprises the processor configured to reduce a privilege associated with the object.

25. The apparatus of claim 19, wherein the memory including the computer program code is further configured to, with the processor, cause the apparatus to update a policy file based at least in part on the modified privilege associated with the object comprises the processor configured to at least one of add, delete, or modify an entry provided in the policy file.

26. The apparatus of claim 19, wherein in an instance in which the object is associated with the virtual community location, one or more caged applications may access the object.

27. The apparatus of claim 26, wherein the memory including the computer program code is further configured to, with the processor, cause the apparatus to associate the object to a virtual community location comprises the processor configured to associate the object to a virtual community location based at least on at least one of a plurality of criteria.

28. An apparatus comprising:
means for enabling a caged application to access an object by:
means for receiving an indication to modify at least one privilege associated with the object;
means for modifying the at least one privilege associated with the object based at least in part on the indication and by associating the object with a virtual community location;
means for updating a policy file based at least in part on the modified privilege associated with the object; and
means for providing for an output of the object based at least in part on the modified privileged associated with the object.

* * * * *

UNITED STATES PATENT AND TRADEMARK OFFICE
CERTIFICATE OF CORRECTION

PATENT NO. : 8,190,636 B2  
APPLICATION NO. : 12/242281  
DATED : May 29, 2012  
INVENTOR(S) : Ekberg et al.

Page 1 of 1

It is certified that error appears in the above-identified patent and that said Letters Patent is hereby corrected as shown below:

<u>Column 1,</u>  
Line 13, "modem" should read --modern--.

<u>Column 15,</u>  
Lines 43, 45, 48, and 51, "privileged" should read --privilege--.

<u>Column 16,</u>  
Lines 26, 29, 31, and 35, "privileged" should read --privilege--.

<u>Column 17,</u>  
Lines 16, 19, and 25, "privileged" should read --privilege--.

<u>Column 18,</u>  
Line 35, "privileged" should read --privilege--.

Signed and Sealed this  
Twelfth Day of March, 2013

Teresa Stanek Rea  
*Acting Director of the United States Patent and Trademark Office*